United States Patent [19]

Oka

[11] Patent Number: 4,946,193
[45] Date of Patent: Aug. 7, 1990

[54] UTILITY VEHICLE HAVING CARGO BEARING SURFACES INCLUDING A FOLDED SEAT BACK

[75] Inventor: Yoshio Oka, Hermosa Beach, Calif.

[73] Assignee: Honda Giken Kogyo Kabushiki Kaisha, Tokyo, Japan

[21] Appl. No.: 284,370

[22] Filed: Dec. 14, 1988

Related U.S. Application Data

[63] Continuation-in-part of Ser. No. 47,834, May 6, 1987, abandoned.

[51] Int. Cl.[5] .............................. B60N 2/24; B60P 3/40
[52] U.S. Cl. ...................................... 280/769; D12/14; 180/907; 180/908; 296/198; 296/65.1; 297/378
[58] Field of Search ................... 180/89.1, 210, 215, 180/908; 280/DIG. 5, 769, 798, 796; 296/65.1, 203, 204, 198; 297/331, 332, 378, 232; 224/274, 309, 317, 325, 326; D12/14, 15

[56] References Cited

U.S. PATENT DOCUMENTS

| | | | |
|---|---|---|---|
| D. 269,077 | 5/1983 | Horton | D12/14 |
| D. 269,078 | 5/1983 | Taylor | D12/14 |
| 1,317,814 | 10/1919 | Norwalk | 180/89.1 |
| 1,542,854 | 6/1925 | Carlson | 296/65.1 |
| 3,704,758 | 12/1972 | Cropp | 280/DIG. 5 |
| 4,509,787 | 4/1985 | Knaack et al. | 224/324 |
| 4,519,646 | 5/1985 | Leitermann et al. | 297/378 |
| 4,655,309 | 4/1987 | Imaizumi et al. | 180/215 |

FOREIGN PATENT DOCUMENTS 3308495 7/1984 Fed. Rep. of Germany ...... 297/378

Primary Examiner—Charles A. Marmor
Assistant Examiner—Karin Tyson
Attorney, Agent, or Firm—Lyon & Lyon

[57] ABSTRACT

Utility vehicles having four wheels, one or more seats, a steering column and a forward mounting power unit. The devices are shown to be either two of four wheel drive. Extending from behind the rear wheels to a position behind the steering column, a flat floor provides substantial storage area. When two seats are employed, the driver seat is displaced to one side of the vehicle and racks extend fore-and-aft in the same plane. The passenger's seat back may be lowered to further define that plane. The engine is mounted directly between the front wheels for compactness and protection.

8 Claims, 15 Drawing Sheets

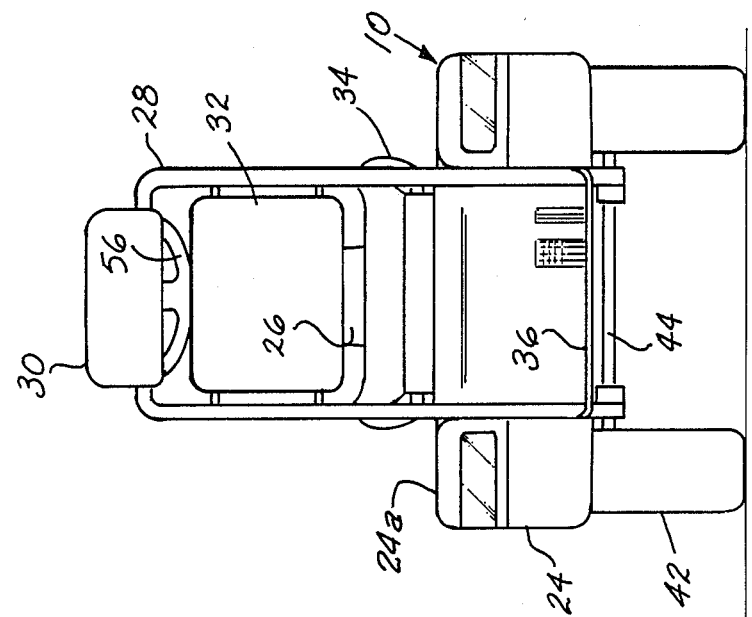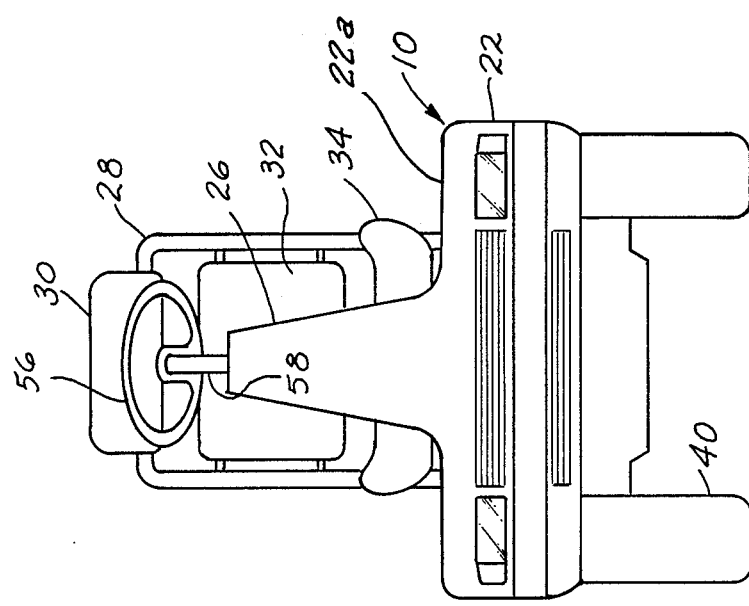

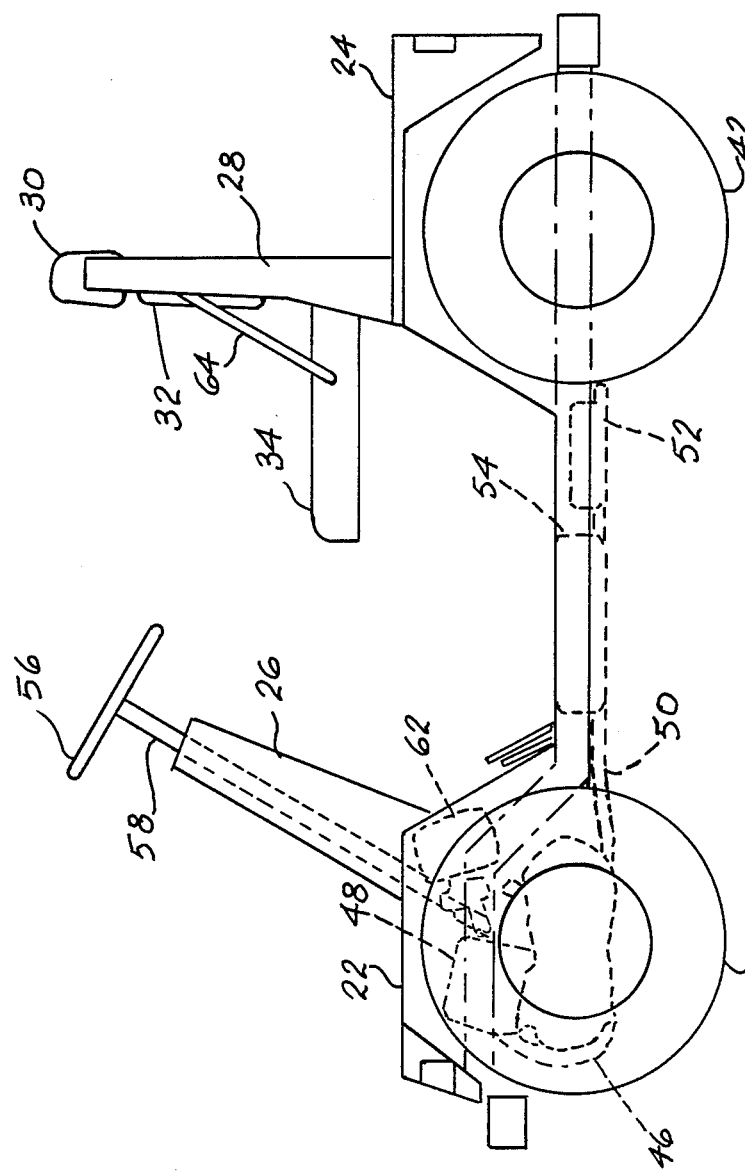

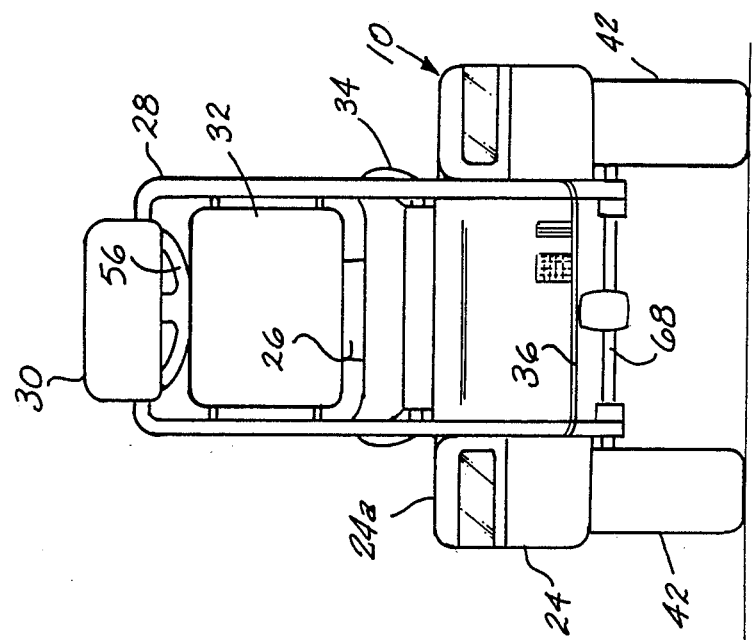
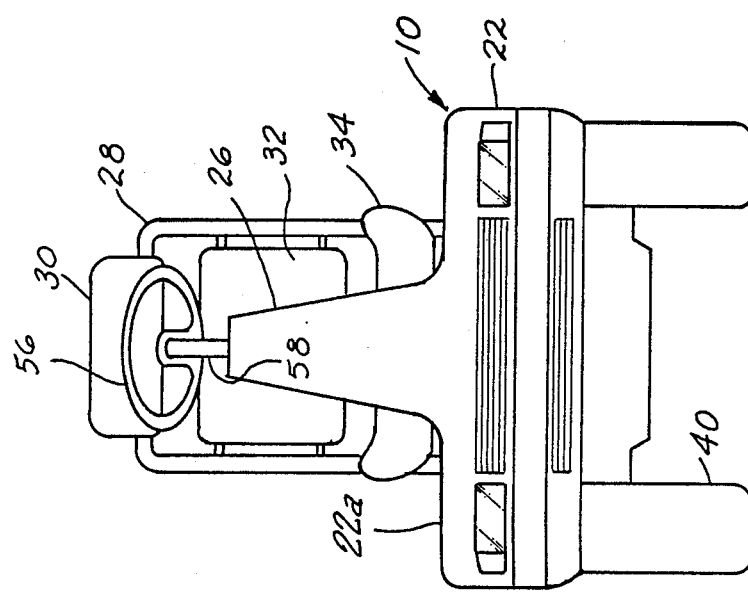

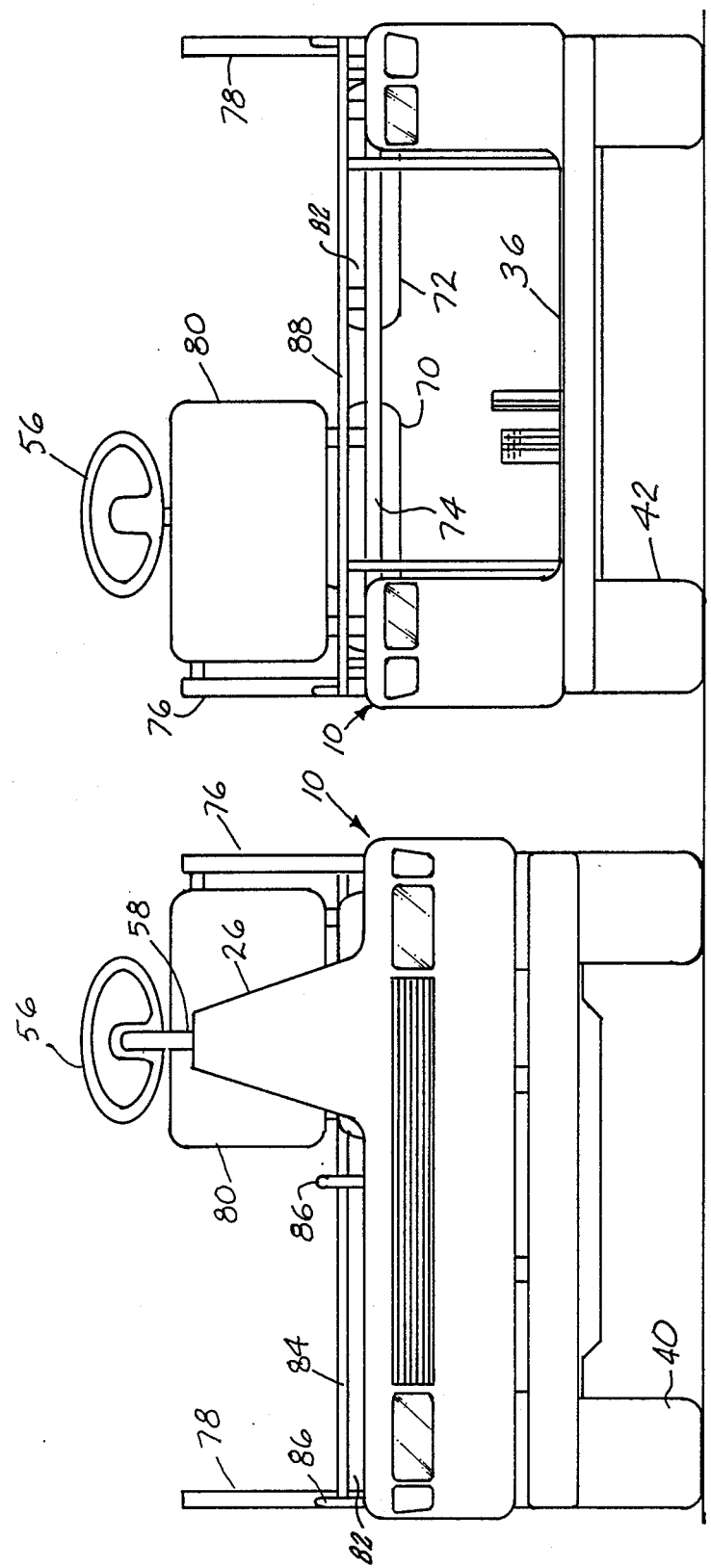

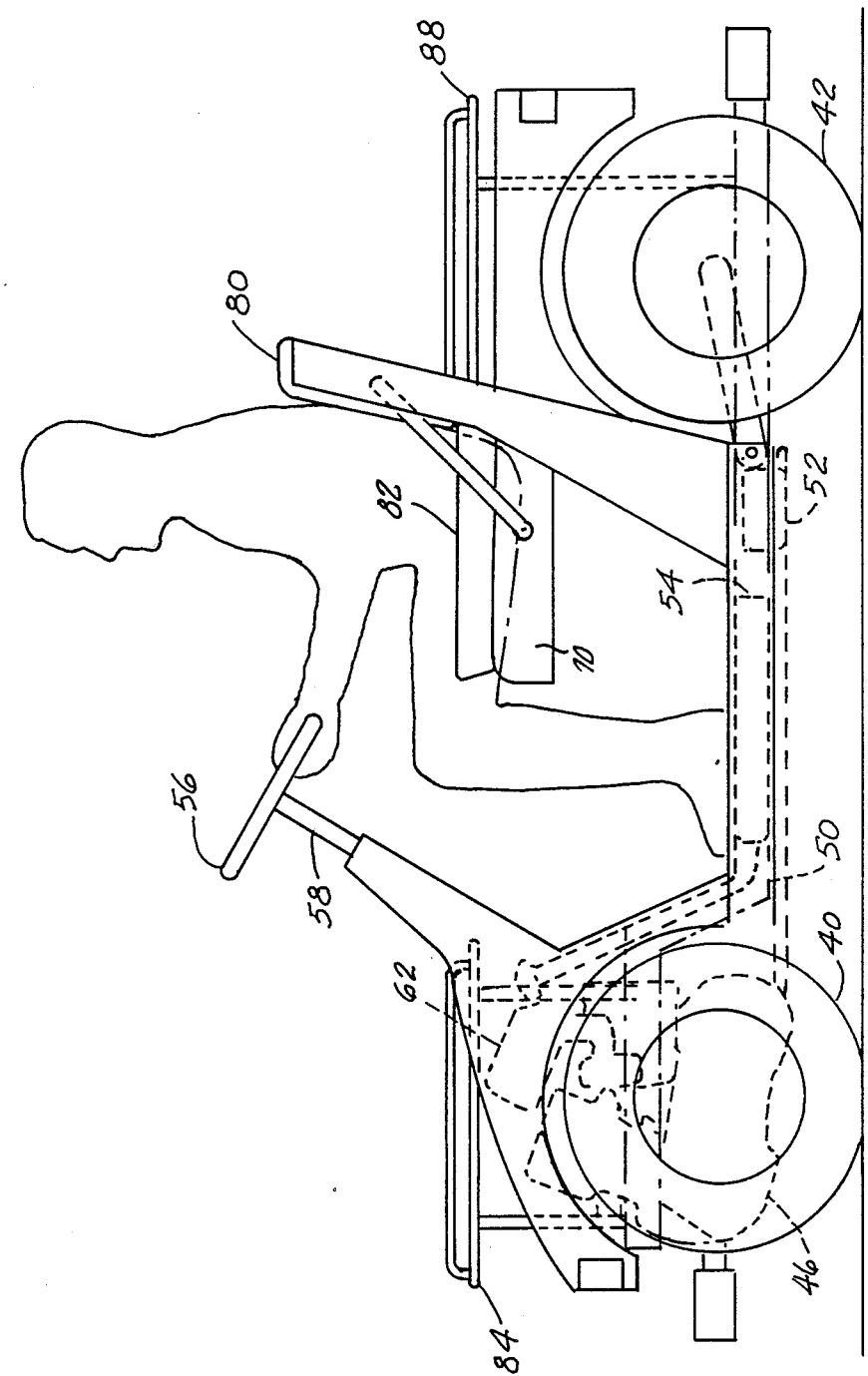

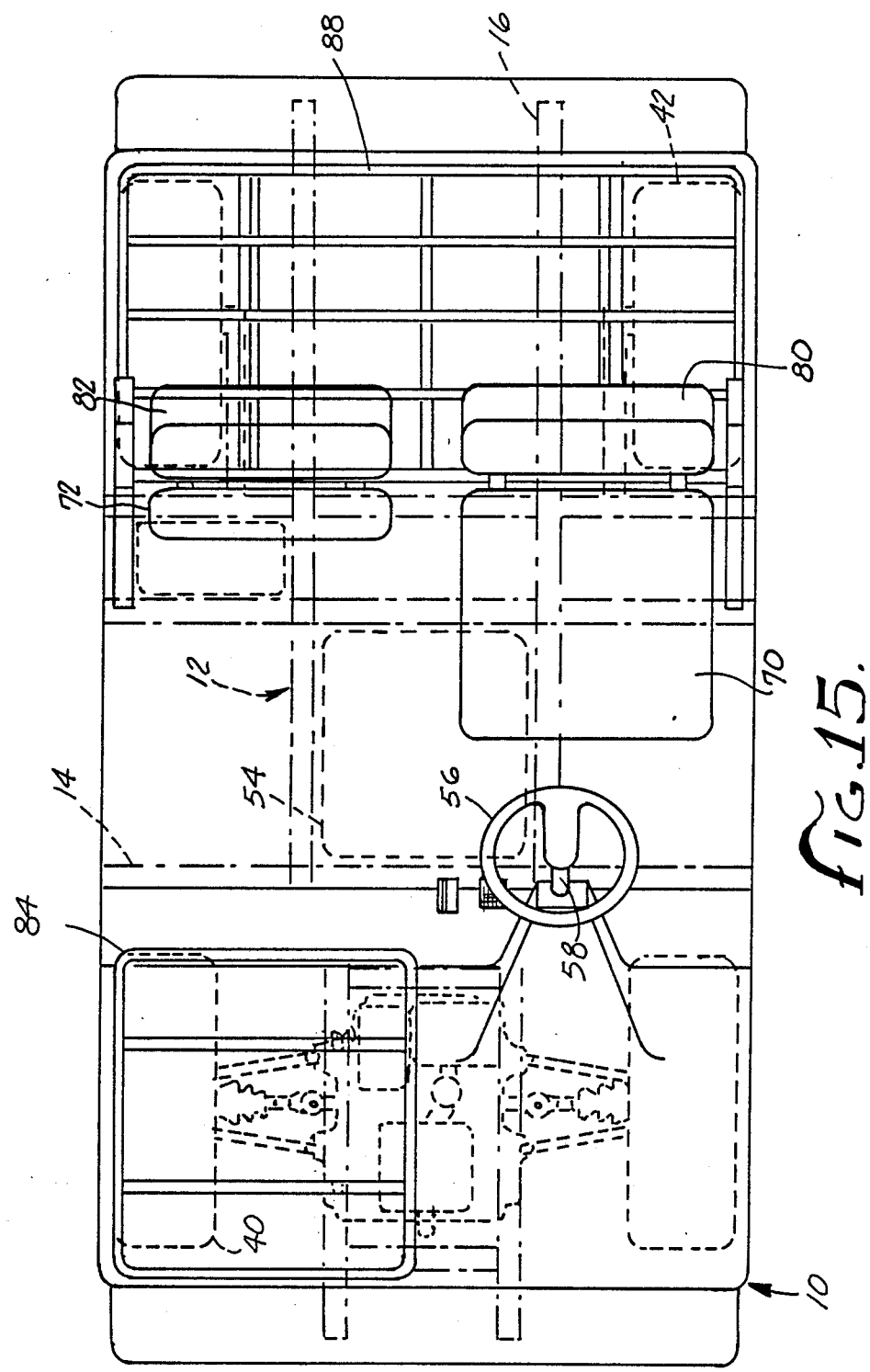

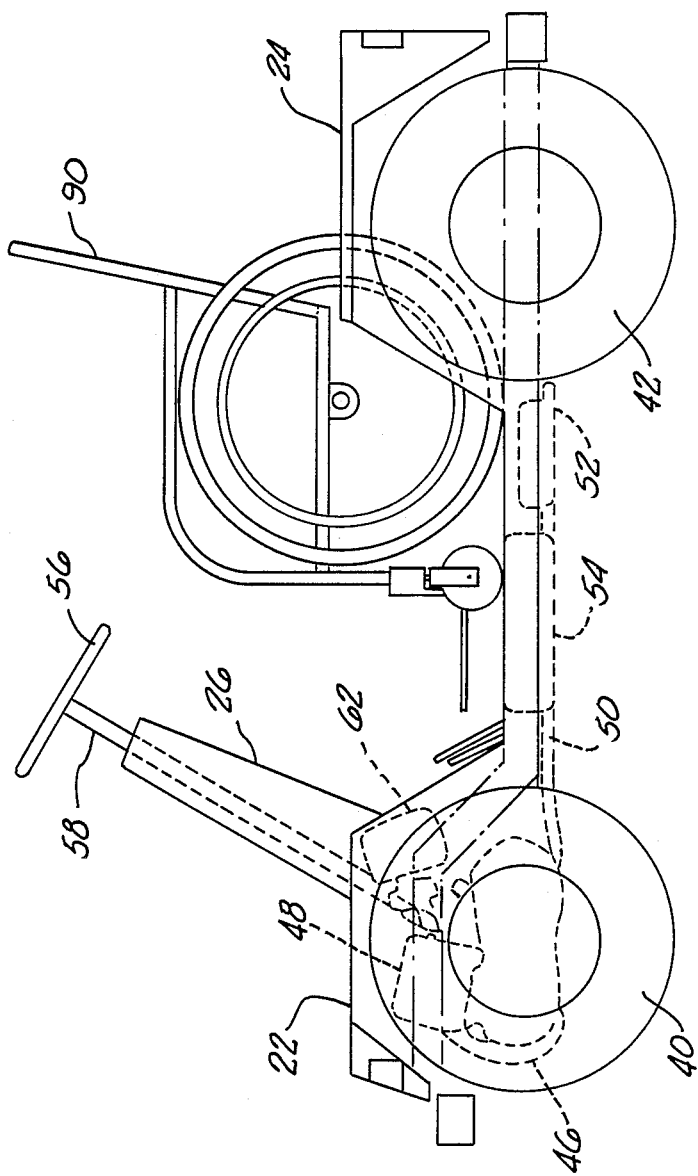

UTILITY VEHICLE HAVING CARGO BEARING SURFACES INCLUDING A FOLDED SEAT BACK

This application is a continuation-in-part of U.S. patent application Ser. No. 047,834, filed May 6, 1987, now abandoned.

BACKGROUND OF THE INVENTION

The field of the invention is small four wheel vehicles.

Utility-type carts and vehicles employed as run-about vehicles in large plants and institutions, golf carts and the like have been known. Such devices typically employ electric drive with a motor and batteries or a small two-cycle or four-cycle engine. Such vehicles come in a variety of configurations including forward seating devices with truck beds and more conventional seating devices with luggage racks. With such devices, storage capacity thereon is generally not maximized, particularly for long objects.

SUMMARY OF THE INVENTION

The present invention is directed to utility vehicles of relatively simple construction and substantial storage capacity. In a first aspect of the present invention, a substantially flat floor extends from rearwardly of the rear wheels to forwardly of the seating position and behind the steering column. This provides for maximum storage capacity for long objects as well as multiple shorter objects.

In another aspect of the present invention further storage is made available by employing a first rack at the front and a second rack at the back of the vehicle lying in a common horizontal plane. The position for the driver may be offset to allow for additional carrying capacity for long objects. A passenger seat may fold to further define the surface in the horizontal plane.

A variety of other features are also found as illustrated in the preferred embodiments. Accordingly, it is an object of the present invention to provide an improved utility vehicle having substantial storage capacity. Other and further objects and advantages will appear hereinafter.

BRIEF DESCRIPTION OF THE DRAWINGS

In the drawings, similar reference characters denote similar elements throughout the several views.

FIG. 1 is a front view of a first embodiment of the present invention.
FIG. 2 is a rear view of the device of FIG. 1.
FIG. 3 is a side view of the device of FIG. 1.
FIG. 6 is a front view of a second embodiment of the present invention.
FIG. 7 is a rear view of the device of FIG. 6.
FIG. 10 is a front view of a third embodiment of the present invention.
FIG. 11 is a rear view of the device of FIG. 10.
FIG. 12 is a plan view of the device of FIG. 10.
FIG. 15 is a seCond plan view of the device of FIG. 10.
FIG. 18 is a side view of the device of FIG. 16.

DETAILED DESCRIPTION OF THE PREFERRED EMBODIMENT

Figure 4:
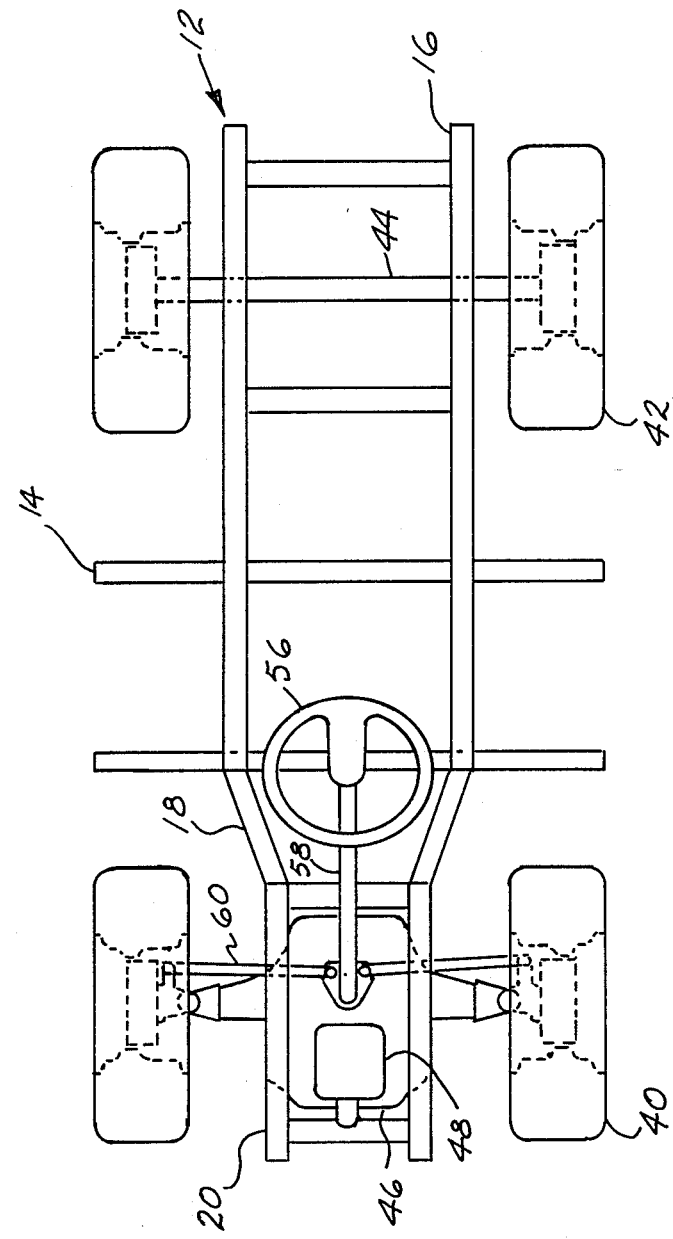
FIG. 4 is a plan view of the frame of the device of FIG. 1

Turning in detail to the drawings, FIG. 1 illustrates a first vehicle incorporating a body, generally designated 10. The body 10 is supported on a frame, generally designated 12. The frame 12 includes lateral members 14 and longitudinal members 16. These members 14 and 16 define a horizontal surface through a substantial length of the vehicle. At the forward end of the vehicle, the longitudinal frame members 16 include angled members 18 which rise upwardly and forwardly to mounting members 20 which extend forwardly to the forward end of the vehicle. The body 10 positioned on the frame 12 includes front and rear fender wells 22 and 24 and a pillar 26 for the steering column.

Extending upwardly and supported from the frame is a seat mounting structure 28. The seat mounting structure 28 supports a headrest 30, a backrest 32 and a seat 34. The seat mounting structure 28 extends downwardly adjacent the fender wells 24 in order to provide an open area beneath the seat 34.

A floor 36 extends in a substantially flat manner forwardly from behind the rear wheels. The forward extension of the substantially flat floor is to a point forwardly of the seat 34. Behind the steering column, the floor slants upwardly and forwardly in a footrest portion 38.

The exterior surfaces 22a and 24a of the fender wells 22 and 24 are formed as generally planar, horizontally disposed surfaces capable of performing a cargo-bearing function. As shown in FIGS. 1 and 2, the surfaces 22a and 24a on opposite sides of the steering column pillar 26 and the seat mounting structure 28 are disposed in longitudinally aligned, coplanar relation for accommodating cargo, such as lumber or pipes, or the like, having an extended length.

Figure 5:
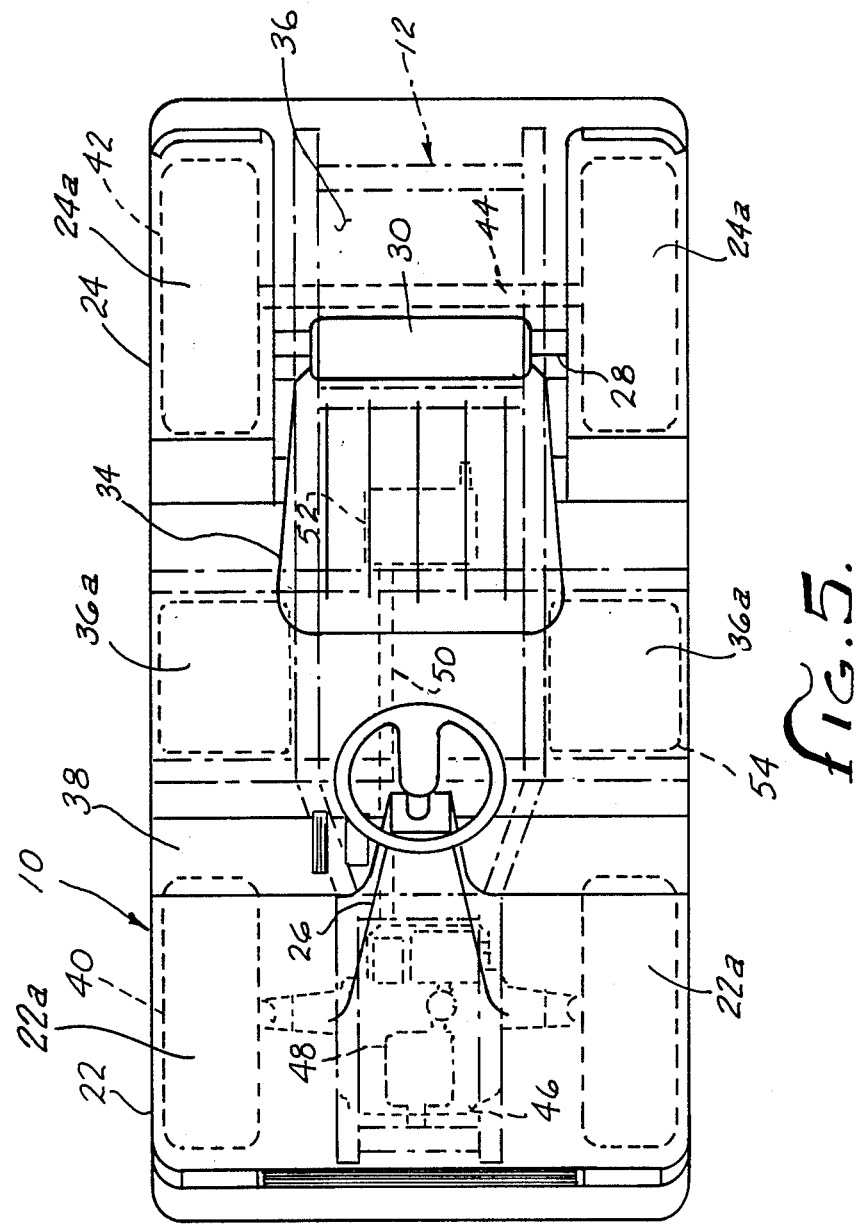
FIG. 5 is a plan view of the device of FIG. 1.
Figure 8:
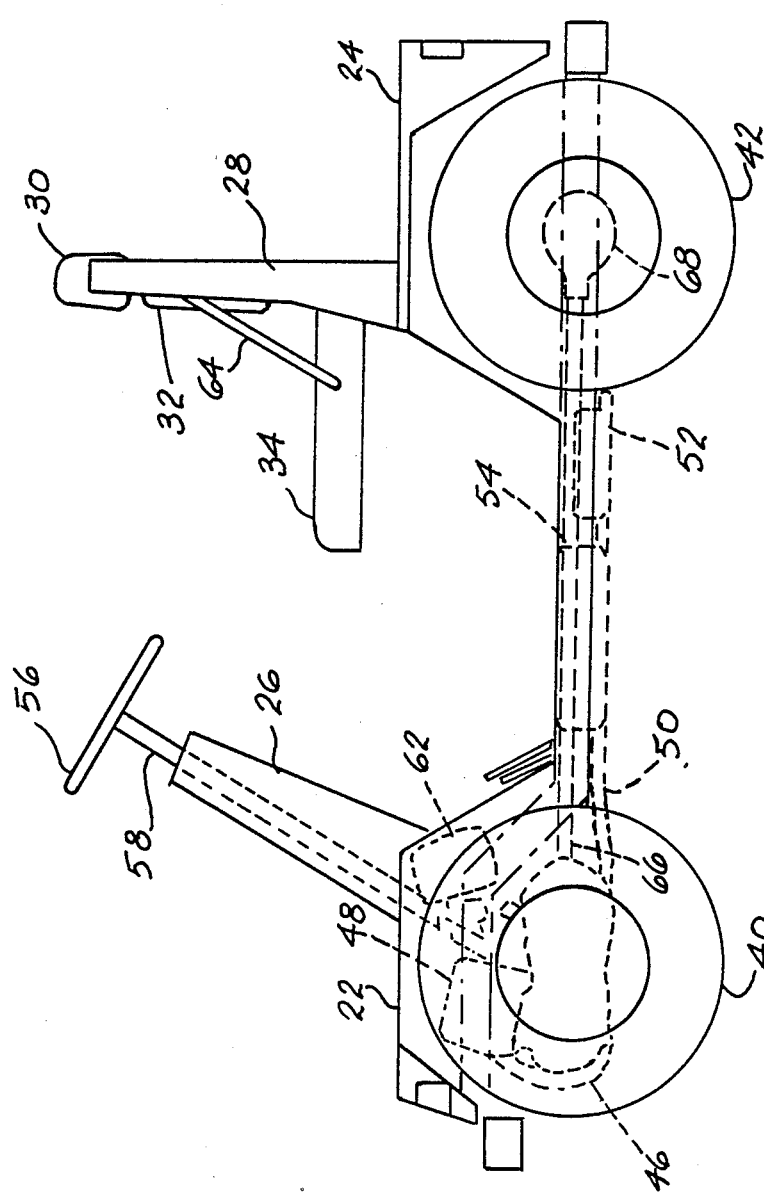
FIG. 8 is a side view of the device of FIG. 6.
Figure 9:
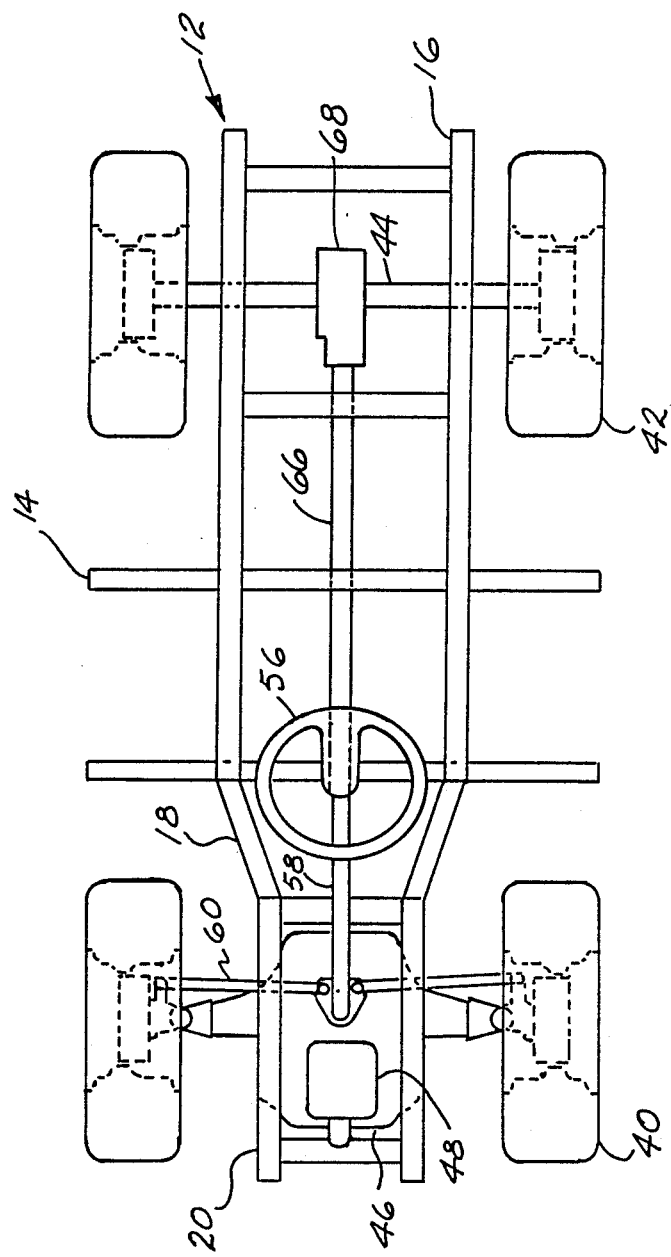
FIG. 9 is a plan view of the frame of the device of FIG. 6.
Figure 13:
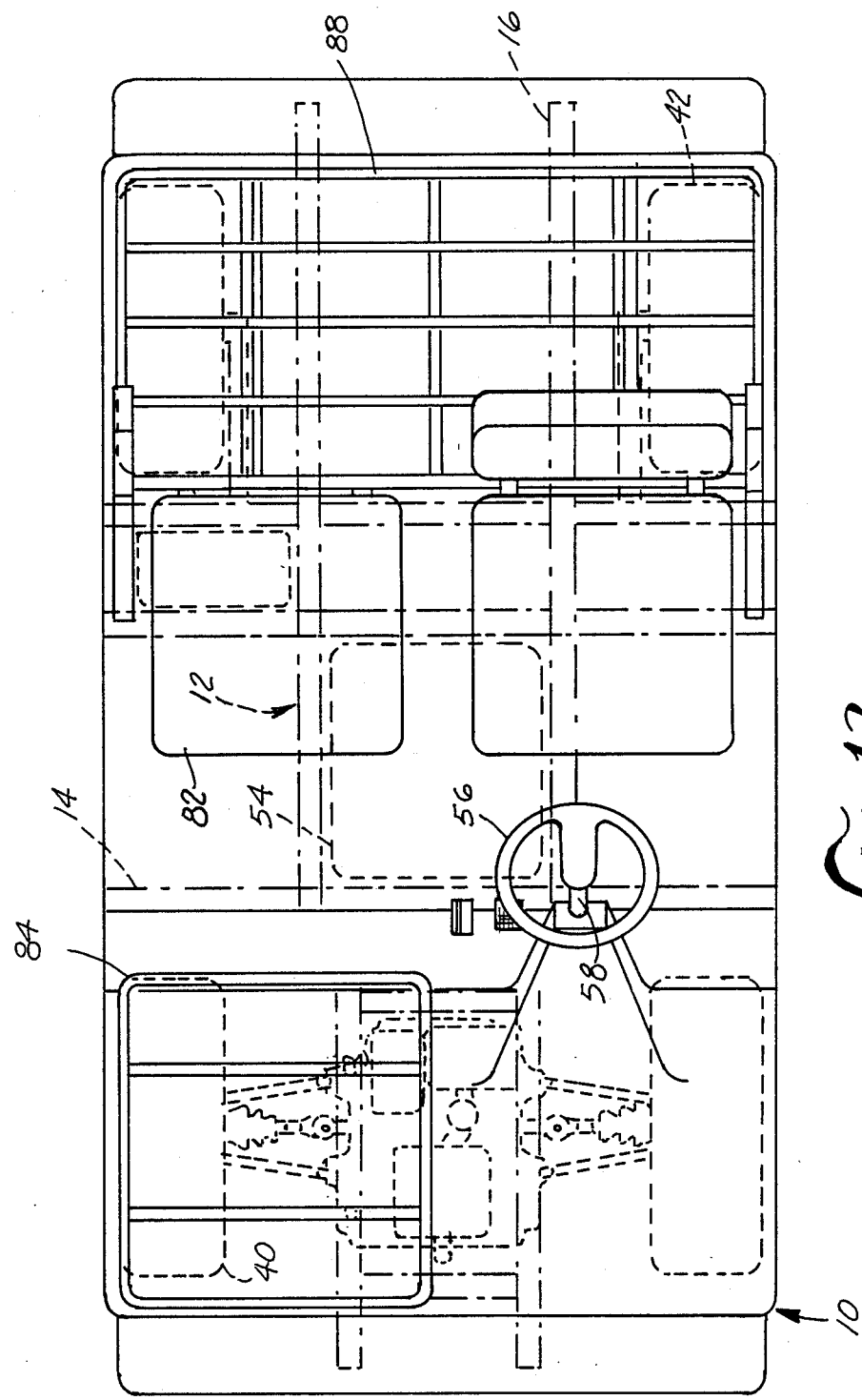
FIG. 13 is a side view of the device of FIG. 10.

Also, the floor portions on opposite sides of the seat mounting structure 28, which portions are indicated in FIG. 5 by the reference numerals 36a, provide additional cargo-carrying capacity for the vehicle.

Supporting the frame are front wheels 40 spaced apart from the center of the vehicle and rear wheels 42 also spaced apart from the center of the vehicle. The rear wheels 42 are supported on an axle 44. Associated with the front wheels 40 is a power unit 46. The power unit 46 includes a cylinder head 48 extending upwardly and slanted rearwardly on the vehicle. The power unit 46 is mounted immediately between the front wheels 40 with drive shafts extending outwardly thereto. The drive unit may include a transmission with a variable drive pulley mechanism, or similar convenient system. An exhaust pipe 50 extends rearwardly to a muffler 52. A fuel tank 54 is located to either side of the vehicle beneath the floor 36.

The vehicle incorporates a steering system including a steering wheel 56, a steering column 58 and tie rods 60. The steering column extends at an angle downwardly toward the power unit 46 where it terminates just rearwardly of the cylinder 48. Depending on the height of the engine, the power unit 46 may be contained fully within the area between the tires as can best be seen in FIG. 3 where only the air cleaner 62 and exhaust pipe 50 extend outwardly from that profile.

Thus, FIGS. 1 through 5 disclose a convenient utility vehicle having a substantial amount of cargo room from the back end of the vehicle forwardly to beneath the seat. The seat 34 may also be tipped upwardly as held by a flexible or retractable support 64. The steering wheel may tilt and the rider may stand to maneuver the vehicle where appropriate.

Looking next to the embodiment of FIGS. 6 through 9, a very similar mechanism is illustrated in which corresponding reference numbers are employed to represent identical of or equivalent components. Illustrated in this second embodiment is a four wheel drive vehicle having a drive shaft 66 and a rear axle 68. Otherwise, the vehicle is shown to be substantially similar to that of the first embodiment.

Figure 14:
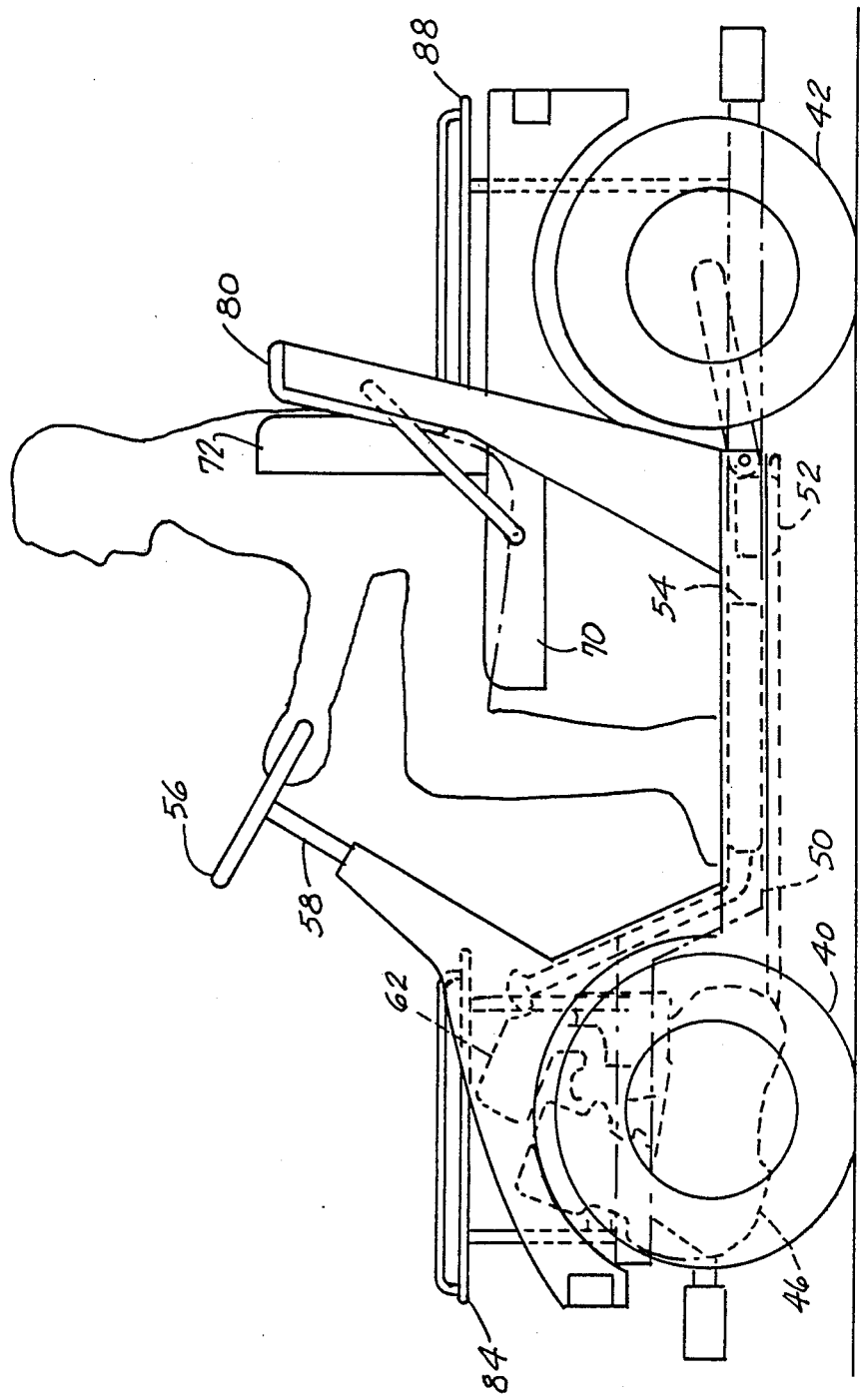
FIG. 14 is a second side view of the device of FIG. 10.
Figure 17:
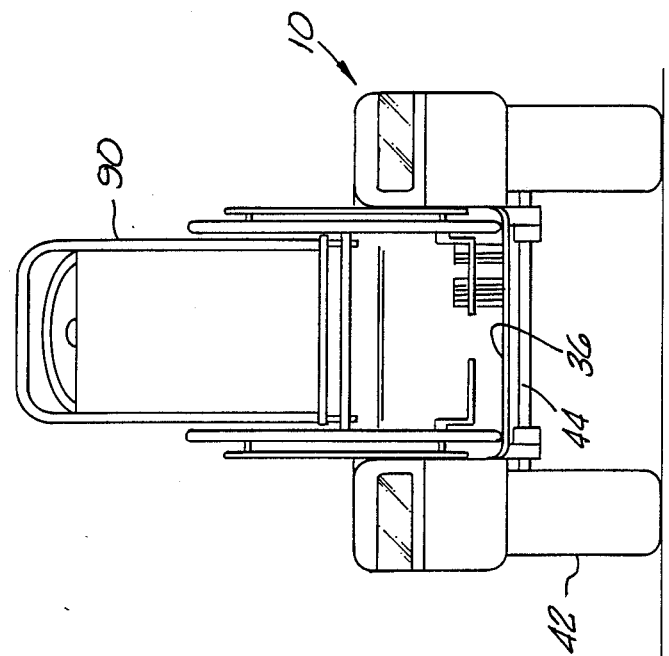
FIG. 17 is a rear view of the device of FIG. 16.
Figure 16:
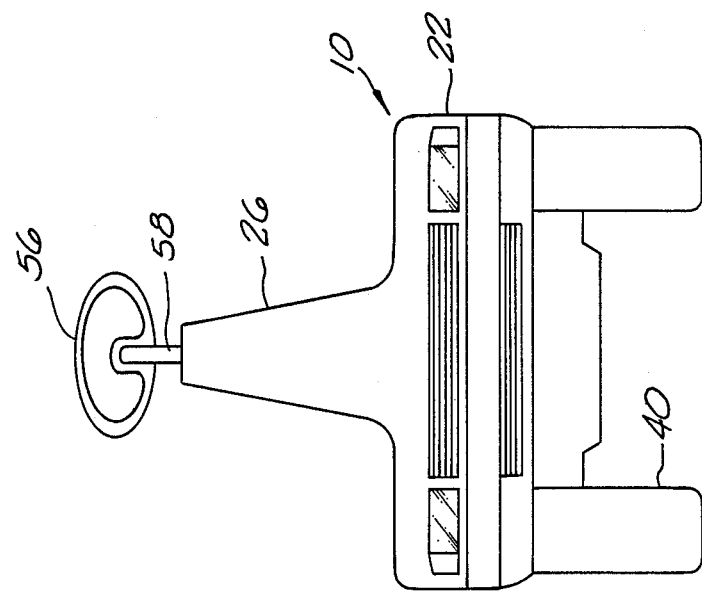
FIG. 16 is a front view of a fourth embodiment of the present invention.
Figure 19:
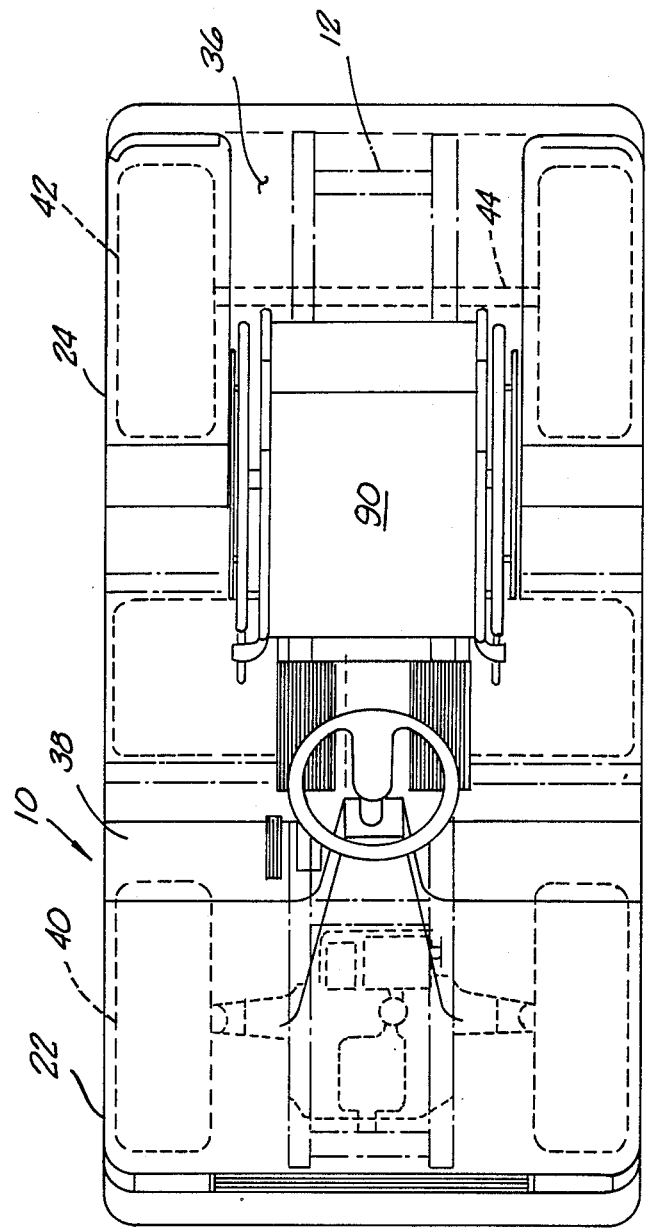
FIG. 19 is a plan view of the device of FIG. 16.

Looking next to the embodiment of FIGS. 10 through 15, another embodiment is illustrated. Again, similar reference numerals are applied for identical or equivalent components. The steering shaft 58 and associated steering wheel 56 is offset to one side of the vehicle. Furthermore, two seats 70 and 72 are arranged side by side and supported on a frame structure 74. Seat mounting structures 76 and 78 are supported by the frame structure 74 and, in turn, support the seating structures 70 and 72. The seats include seat backs 80 and 82. In FIGS. 10 through 13, the seat back 82 is shown folded down. As can be seen in FIG. 12, the seat back 82 when folded lies in a horizontal plane. The back of the seat back 82 may be hard to accommodate the placement of items thereon. In FIGS. 14 and 15, the seat back 82 is shown to be upright and the seat 72 is also shown to be folded up.

On the forward portion of the vehicle, a rack 84 extends horizontally. The rack 84 is positioned in front of the passenger side of the vehicle. The rack 84 also is shown to have vertical portions 86 to prevent lateral movement of things placed thereon. The rack 84 is also shown, in FIG. 12, to extend in the same horizontal plane as the seat back 82 when down. A rack 88 extends across the back of the vehicle, also at the same horizontal plane as the front rack 84 and the seat back 82.

In the embodiment of FIGS. 10 through 15, substantial loads may be placed on the floor 36 so as to extend forwardly to under the seats 70 and 72. Further, long items may be extended on the racks 84 and 88 across the top of the seat back 82. The seat mounting structure 78 may also act to retain items positioned across the racks. Further, the inner walls of the body prevent items from sliding sideways when stored on the floor 36.

Looking next to the embodiment of FIGS. 16 through 19, the seating has been removed and room for a wheel chair 90 is provided. An appropriate gate mechanism with a ramp or lift may be employed where desired. Further, a stop or stops and tracks may be included to guide and lock the wheel chair 90 in place. Again, the floor extending forwardly of the seating position provides a very useful platform on the vehicle.

Thus, a variety of small vehicle embodiments are illustrated which provide for maximum storage and utility. While embodiments and applications of this invention have been shown and described, it would be apparent to those skilled in the art that many more modifications are possible without departing from the inventive concepts herein. The invention, therefore is not to be restricted except in the spirit of the appended claims.

I claim:

1. A substantially body-less utility vehicle, comprising:
   a frame;
   substantially rectangularly disposed front and rear wheels supporting said frame;
   drive means carried by said frame and operatively connecting at least one of said front and rear wheels for driving said vehicle;
   a steering mechanism coupled with said front wheels including an upstanding steering column extending downwardly from above said frame to between said front wheels;
   a seat support positioned between said front and rear wheels rearwardly of said steering column, said seat support including a first seat and backrest rearwardly of said steering column and a second seat and backrest in laterally spaced relation thereto, said backrest for said second seat being adapted to pivot to a folded, horizontal position upon said second seat, and rack means in longitudinal alignment with said second seat including a first rack and a second rack in substantially overlying relation to said front and rear wheels, respectively, and said racks and said folded seat back being disposed in substantially horizontally aligned relation;
   said seat means and said backrest means being separate from one another, and means for mounting at least said backrest means to said seat support for pivotal movement to extend the storage area of said vehicle.

2. The utility vehicle of claim 1 in which said racks each include a pair of laterally spaced, longitudinally extending rails to restrict lateral movement of articles carried on said racks.

3. The utility vehicle of claim 1 in which said folded backrest presents a hard supporting surface.

4. A substantially body-less utility vehicle, comprising:
   a frame;
   substantially rectangularly disposed front and rear wheels supporting said frame;
   a steering mechanism coupled with said front wheels including an upstanding steering column extending downwardly to between said front wheels;
   fender wells supported by said frame over each of said front and rear wheels, each of said fender wells having exterior surface means for cargo-bearing purposes;
   seat means positioned on said frame rearwardly of said steering column between said front and rear wheels, said seat means including a seat in substantial longitudinal alignment between a front and a rear wheel, and a pivotally mounted, foldable backrest associated with said seat, said backrest, when folded, defining a support surface in substantial coplanar relation with said exterior surface means of said fender wells of the associated front and rear wheels to extend the cargo-bearing capability of said vehicle.

5. The utility vehicle of claim 4 which said exterior surface means of said fender wells is defined by racks mounted on said fender wells, and said racks on the fender wells of said front and said rear wheels and said folded backrest being disposed in substantial coplanar relation.

6. The utility of vehicle of claim 5 in which said racks each include a pair of laterally spaced, longitudinally extending rails to restrict lateral movement of articles carried on said racks.

7. The utility of vehicle of claim 4 in which said folded backrest presents a hard supporting surface.

8. The utility vehicle of claim 4 in which said seat means includes a pair of seat in laterally spaced relation, at least one of said seats being disposed seat in substantial longitudinal alignment between a front and a rear wheel and having a pivotally mounted foldable backrest which, when folded, defines a surface in substantial coplanar relation with said exterior surface means of said fender wells of the associated front and rear wheels to extend the cargo-bearing capability thereof.

* * * * *

UNITED STATES PATENT AND TRADEMARK OFFICE
CERTIFICATE OF CORRECTION

PATENT NO. : 4,946,193
DATED : August 7, 1990
INVENTOR(S) : Yoshio Oka

It is certified that error appears in the above-identified patent and that said Letters Patent is hereby corrected as shown below:

In claim 6 (column 5, line 1), delete "of" - first occurrence.

In claim 7 (column 5, line 5), delete "of" - first occurrence.

In claim 8 (column 5, line 8), delete "seat" and insert therefor -- seats --.

In claim 8 (column 6, line 1), delete "seat".

Signed and Sealed this

Twenty-eighth Day of April, 1992

Attest:

HARRY F. MANBECK, JR.

*Attesting Officer*  *Commissioner of Patents and Trademarks*